United States Patent [19]

Kondoh et al.

[11] Patent Number: 4,527,973
[45] Date of Patent: Jul. 9, 1985

[54] PRECALCINER FOR CEMENT RAW MEAL

[75] Inventors: Takehiko Kondoh; Masahiko Kitajima, both of Yamaguchi, Japan

[73] Assignee: UBE Industries, Ltd., Yamaguchi, Japan

[21] Appl. No.: 561,579

[22] Filed: Dec. 14, 1983

[30] Foreign Application Priority Data

Dec. 23, 1982 [JP] Japan .................................. 57-224888
May 17, 1983 [JP] Japan .................................. 58-84980

[51] Int. Cl.³ .......................... F27B 15/00; F27B 7/02
[52] U.S. Cl. ....................................... 432/58; 432/106
[58] Field of Search ............................ 432/106, 58, 14

[56] References Cited

U.S. PATENT DOCUMENTS

| | | | |
|---|---|---|---|
| 3,140,863 | 7/1964 | Forsyth et al. | 432/58 |
| 3,273,257 | 9/1966 | Johnson et al. | 432/58 |
| 3,298,110 | 1/1967 | Kos et al. | 432/58 |
| 4,248,639 | 2/1981 | Quittkat | 432/106 |
| 4,337,032 | 6/1982 | Duplouy et al. | 432/106 |

Primary Examiner—John J. Camby
Attorney, Agent, or Firm—Blakely, Sokoloff, Taylor & Zafman

[57] ABSTRACT

A precalciner for cement raw meal is divided into upper and lower parts. The upper part is shaped into a cylinder, while the lower part is constituted by upper and lower inverted conical portions. The upper inverted concial portion has a cone angle smaller than that of the lower inverted conical portion and is connected to the lower end of the upper part through a throttle device.

8 Claims, 7 Drawing Figures

PRECALCINER FOR CEMENT RAW MEAL

BACKGROUND OF THE INVENTION

This invention relates to a precalciner for cement raw meal.

Various types of cement production equipment including a precalciner provided with an independent heat source and interposed between a suspension preheater and a rotary kiln have been proposed and the equipment is characterized by the types of its precalciner.

Among the cement production equipments, one in which a spouted bed of cement raw meal is formed by kiln exhaust gas for calcining the raw meal has such advantages that (1) the construction of the equipment is simple, (2) the pressure loss is relatively small, (3) since the raw meal is circulated in the spouted bed, the residence time of the raw meal is relatively long, and (4) since the kiln exhaust gas duct is connected to the bottom of the precalciner, such foreign matters as coatings created in the precalciner or fallen from a preheater during the operation of the equipment can be discharged into the kiln.

FIG. 1 shows one example of the prior art cement production equipment of the type described above which comprises an induced draft fan 1 for exhausting of the entire gas, cyclones 2 through 5, a raw meal feed pipe 6, a precalciner 7, a kiln exhaust gas duct 11, a burner 9, a raw meal feed pipe 8 for the precalciner 7, a tertiary air duct 10 for tertiary air extracted from a clinker cooler 13, a rotary kiln 12, and a raw meal feed pipe 15.

Elements bounded by dot and dash lines constitute a preheating device P.

The upper end of the precalciner 7 is connected to the lowermost cyclone 5 via a precalciner exhaust gas duct 14, while the lower end is connected to the kiln exhaust gas feed duct 11.

The bottom of the precalciner 7 has an inverted cone shape so that the kiln exhaust gas forms a spouted bed and the upper portion of the precalciner 7 is cylindrical.

It will be understood by those skilled in the art that the cyclones of the preheating device P may be replaced with known counterflow type heat exchangers.

With this construction, the major portion of the raw meal fed into the precalciner descends along the wall surface thereof and then is blown upwardly from the bottom of the inverted conical part by spout of the kiln exhaust gas. A portion of the raw meal blown upwardly by the spout is brought to the upper portion and exhausted from the precalciner, while the remaining portion diffuses toward the wall surface of the precalciner and again flows down therealong. Accordingly, a circulating flow of the raw meal is created to increase the residence time of the raw meal in the precalciner. This phenomenon is enhanced by introducing the tertiary air as a swirling flow. The necessary residence time can be maintained by the circulation of the raw meal.

The prior art precalciner as shown in FIG. 1 having an inverted conical bottom and a cylindrical upper portion has the following disadvantages. More particularly, in order to ensure a sufficiently long residence time of the raw meal in the precalciner, it is necessary to increase the ratio between the diameters of the cylindrical portion and the outlet throat of kiln exhaust gas so as to increase the circulating load of raw meal. Consequently, the circulation phenomenon of the raw meal mainly concentrate at the lower inverted conical portion, thus greatly increasing the concentration of the raw meal at this portion and decreasing the concentration at the upper portion.

Then, a stagnant area of the raw meal is created in the inverted conical portion. Under normal state, this stagnant area balances the spout, but when the draft varies, the raw meal concentrates at the kiln exhaust gas feed port to amplify the draft variation and to cause the not yet calcined raw meal to fall into the kiln.

Moreover, since the combustion region of the fuel is close to the bottom of the cylinder, it is necessary to maintain the raw meal concentration at this region at a high value in order to perform efficient calcination.

With the construction described above, however, the raw meal concentration at the inverted concial portion is extremely high while low at the cylindrical portion, so that it is difficult to maintain a balance between the heat of combustion and the heat of calcination, thereby forming a local high temperature region which tends to cause a coating trouble.

Moreover, in the bottom raw meal stagnant area, since the raw meal is not sufficiently admixed with the gas, heat transfer therebetween is poor, thus decreasing reaction rate of calcination in this region. For this reason, even with the same mean residence time, the effective residence time becomes shorter as compared to a case wherein the dispersion of the raw meal is sufficient. Consequently, the calcination rate of the raw meal decreases. To increase this rate, it is necessary to increase the volume of the precalciner.

The localization of the raw meal at the inverted conical portion may be avoided by decreasing the cone angle of the inverted conical portion but such a construction increases the height of the precalciner.

Moreover, when the cone angle of the inverted conical portion is decreased, the speed of falling down of the raw meal along the wall surface increases, thus weakening the function of the kiln exhaust gas for blocking the raw meal so that the not yet calcined raw meal tends to fall into the kiln. To prevent this phenomenon, it is necessary to greatly increase the spouted flow velocity of the kiln exhaust gas, resulting in an increased pressure loss.

This construction increases the gas speed at the lower portion of the inverted conical portion, so that the concentration of the raw meal decreases greatly, with the result that the local high temperature region increases, thus causing the trouble of coating.

As described above, with the prior art precalciner, it has been very difficult to simultaneously satisfy such requirements as attainment of residence time of the raw meal, uniformity of the concentration distribution of the raw meal, attainment of proper concentration of the raw meal, attainment of proper height of the precalciner, and reduction of the pressure loss.

SUMMARY OF THE INVENTION

Accordingly, it is an object of this invention to provide an improved precalciner for cement raw meal capable of assuring a sufficient residence time of the raw meal, making adequate the concentration of the raw meal, making adequate the precalciner height, and making uniform the concentration distribution of the raw meal, while minimizing the pressure loss.

According to this invention, there is provided a precalciner for cement raw meal of the type wherein the precalciner is connected between a rotary kiln and a suspension preheater for raw meal and provided with an independent heat source, characterized in that the precalciner is divided into an upper part and a lower precalciner part, that the upper part is shaped into a cylinder having a diameter smaller than a maximum diameter of the lower part, that the lower part is constituted by a lower inverted conical portion with its lower end connected to a kiln exhaust gas feed duct, and an upper inverted conical portion connected to the upper end of the lower inverted conical portion, that the upper inverted conical portion has a cone angle smaller than that of the lower inverted conical portion, and that the upper end of the upper inverted conical portion is connected to the lower end of the upper part through a narrowed opening.

DESCRIPTION OF THE PREFERRED EMBODIMENTS

Figure 1:
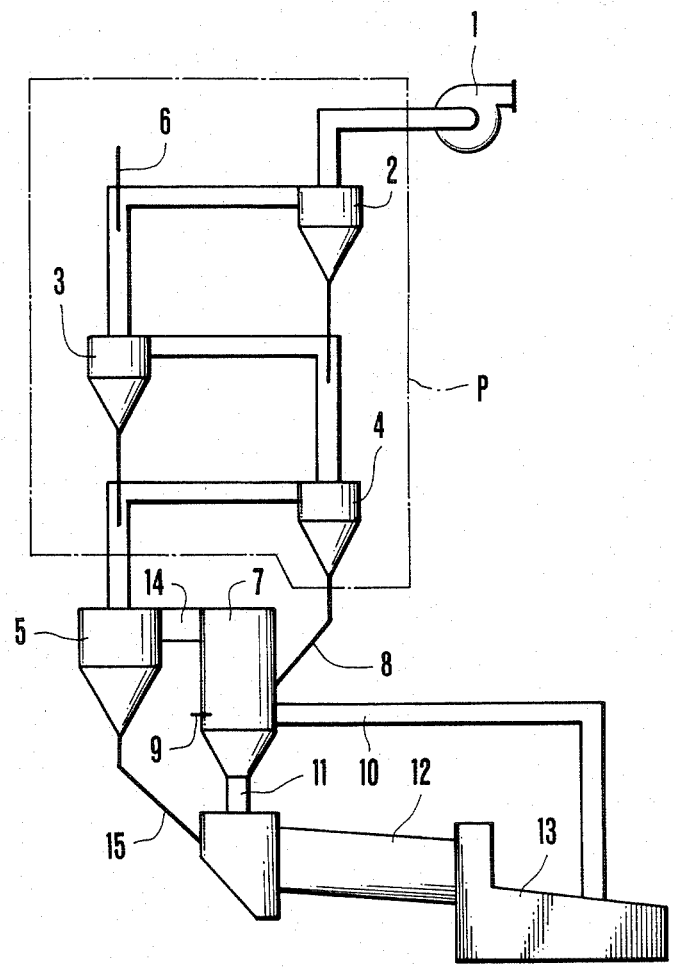
FIG. 1 is a diagrammatic representation showing a prior art cement production equipment.
Figure 2:
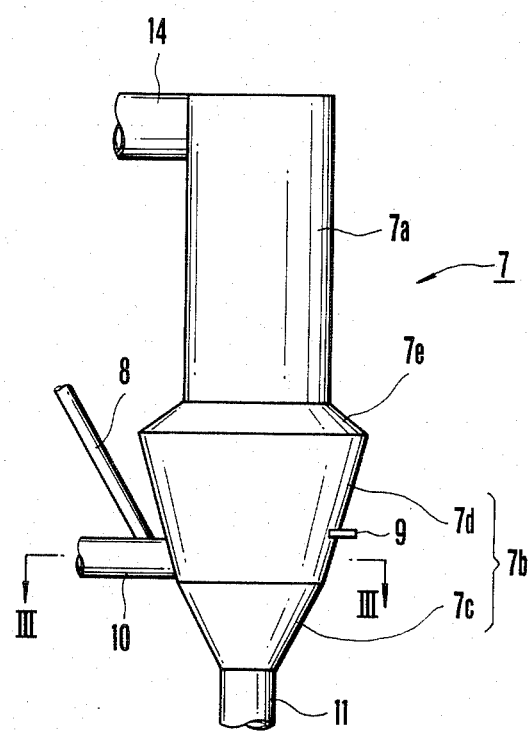
FIG. 2 is side view showing one embodiment of a precalciner for cement raw meal according to this invention.

A preferred embodiment of this invention is shown in FIG. 2 in which elements corresponding to those shown in FIG. 1 are designated by the same reference numerals.

In this embodiment, the precalciner 7 is divided into an upper part 7a and a lower part 7b, the former being formed as a straight cylinder, while the latter as a two stage construction. Thus, the lower part 7b comprises a lower first inverted conical portion 7c and an upper second inverted conical portion 7d having a cone angle smaller than that of the portion 7c.

The upper end of the upper inverted conical portion 7d is connected to the lower end of the upper part 7a through a throttle or constriction 7e. The upper end of the upper part 7a is connected to the lowermost cyclone through the precalciner exhaust gas duct 14.

By constructing the lower part 7b as the two stage construction, the cross-sectional area of the upper second inverted conical portion 7d decreases gradually downwards.

Consequently, a portion of the raw meal falling down along the inner surface of the upper inverted conical portion 7d is entrained in a rising gas stream so that the chance for the raw meal to reach the lower inverted concial portion 7c decreases.

Moreover since the diameter of the inverted conical portion 7d increases upwardly, the gas velocity decreases gradually upwards, the circulation of the raw meal is enhanced due to dispersion of the raw meal toward the wall surface and the downward movement of the raw meal along the wall surface. As the throttle 7e is formed at the upper end of the lower part 7b, the circulation of the raw meal in the lower part is accelerated further.

For this reason, when compared with a construction in which the lower part is constituted by an inverted conical member and a cylindrical member, the raw meal concentration at the bottom becomes low whereas becomes high at the upper portion, thereby making uniform the raw meal concentration in the lower part as a whole.

Figure 3:
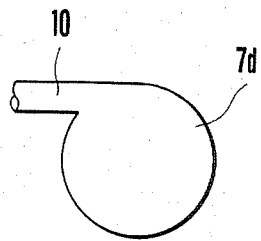
FIG. 3 shows a view as viewed from a cross section taken along line III—III in FIG. 2.
Figure 4:
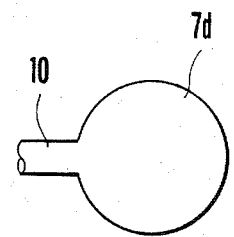
FIG. 4 is a modification of FIG. 3.

This phenomenon occurs when the tertiary air duct 10 from the clinker cooler to the periphery of the second inverted conical portion 7d is directed in the tangential direction as shown in FIG. 3, when directed in the radial direction as shown in FIG. 4 or when directed in the direction between tangential and radial directions.

Instead of using a single tertiary air duct 10, two or more of such ducts may be used. The ducts 10 and 14 illustrated as having a circular cross section may often be replaced by ducts of a square or rectangular cross section.

When the lower part 7b is constructed in a two stage as described above, the raw meal can be distributed uniformly in the lower part 7b so that the quantity of the raw meal stagnating near the bottom of the precalciner can be reduced, thus improving contact between gas and the raw meal.

The cone angle of the lower first inverted conical portion 7c of the lower part is preferably in a range of from 45° to 90°. Because when the cone angle is smaller than 45°, the raw meal blocking capability at this portion decreases so that in order to prevent not yet calcined raw meal from falling down into the kiln, it is necessary to increase the spouted gas velocity beyond a necessary value, resulting in an increased pressure loss. When the cone angle is larger than 90°, the movement of the raw meal at this portion becomes degraded, thus causing accumulation of the raw meal as well as formation of coatings.

The enlarged cone angle of the second inverted conical portion 7d of the lower part is smaller than that of the first inverted conical portion 7c, preferably, in the range of 10° to 45°.

When this angle is smaller than 10°, an extremely localization of the concentration distribution of raw meal occurs as described above whereas when the angle increases beyond 45°, the height of the lower part 7b becomes smaller than the maximum diameter thereof, so that the radial distribution of the axial speed is greatly increased. This results in a maldistribution of the raw meal concentration, blow-through of not calcined raw meal and sputtering of unburnt carbon.

One or a plurality of burners 9 are provided for the lower part 7b and the fuel supplied through these burners burns mainly in the second inverted conical portion 7d to generate high temperature gas. By uniformly distributing the raw meal at this portion, calcination reaction proceeds efficiently to thus improve the calcination efficiency. Due to heat absorption caused by the calcination reaction, creation of local high temperature regions can be prevented, thus making uniform the temperature distribution.

Furthermore, the stagnant area near the bottom of the precalciner in which the raw meal tends to stagnate can be reduced so that the efficient residence time of raw meal in the calcination reaction regions is increased, thereby improving the calcination efficiency.

Since the quantity of the raw meal stagnating near the precalciner bottom is small and moreover since the flow state of raw meal is stable, the pressure loss as well as the pressure variation at this portion is small. Even when the draft is caused to vary due to disturbance, the raw meal is not concentrated at the kiln exhaust gas feed duct and hence the variation would not be amplified, thus ensuring a stable operation.

The throttle 7e at the upper end of the lower part 7b can be made large. Then, the circulating load of raw meal is increased due to collision of the particles and reversal of direction, whereby increase in the residence time of the raw meal in the lower part is enhanced. This is especially important where solid fuel having a slow combustion rate is used as the fuel. Thus, as the solid fuel resides for a long time in the lower part 7b, it is completely burnt in the precalciner 7. Thus, after burning following the precalciner does not occur, thus eliminating the trouble of coating.

It is advantageous to supply the raw meal into the lower part 7b of the precalciner via a pipe (not shown) connected to the throttle 7e but, more preferably, into the tertiary air duct 10 via a raw meal feed pipe 8 connected to the root of the duct 10 as shown because the feed of the raw meal can be facilitated by the air flow in the duct 10.

The raw meal supply port may be one or more, and the raw meal can be admitted into the tertiary air duct 10 as a mixture with air, into the throttle 7e or directly into the second inverted conical portion 7d, or combinations thereof.

The principal function of the upper part 7a is to calcine the not yet calcined raw meal and combustion of unburnt fuel. The raw meal which has been substantially completely calcined in the lower part 7b is vigorously admixed with gas in the upper part 7a to undergo heat exchange for proceeding the calcination reaction, which further increases the calcination rate.

In the upper part 7a too, the rising raw meal spreads toward the wall surface, thus creating circulation of the raw meal falling down along the wall surface.

Since the upper part 7a is designed such that its diameter will be smaller than the maximum diameter of the lower part 7b, the mean gas velocity is high and the radial distribution of the axial gas velocity is made to be uniform so that the circulating load is small and the region of circulation is short. While repeating the circulation through this short region the particles of the raw meal are classified according to the difference in the particle size or the difference in the density caused by the calcination rate, thus elongating the residence time of the not yet calcined raw meal. Since the diameter of the lower portion of the upper part 7a is not reduced, the raw meal circulated in the lower portion of the upper part 7a falls down into the lower part 7b to be calcined therein. These phenomena also contribute to the improvement of the calcination rate of the raw meal.

Figure 5:
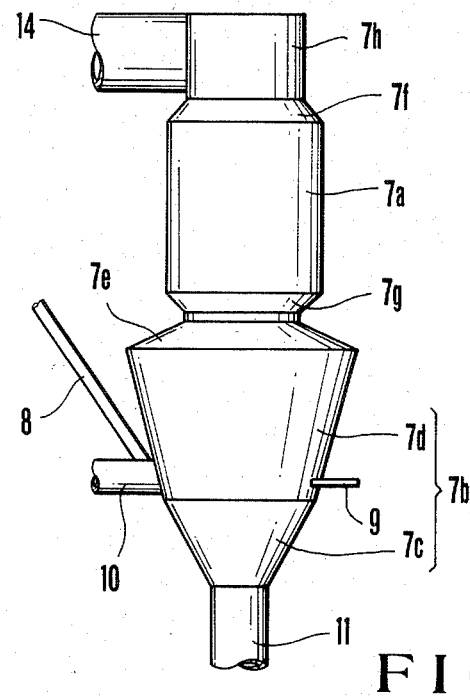
FIG. 5 is a side view showing a modified precalciner embodying the invention.

FIG. 5 shows a modified embodiment of this invention, in which the upper part 7a is formed as a cylinder, and the diameters at both ends thereof are reduced to form throttles 7f and 7g. The throttle 7f is connected to the precalciner exhaust gas duct 14 through a cylindrical portion 7h having a diameter slightly smaller than that of the upper part 7a. The duct 14 is connected to the lowermost cyclone. Even with this modified construction, the performances of the upper and lower parts 7a and 7b do not change.

However, since the lower end of the upper part 7a is throttled, the width of the throttle 7e at the upper end of the lower part 7b is increased, whereby the circulating load of the raw meal in the lower part 7b increases. Further, as a result of the increase in the width of the throttle, the gas flow from the lower part 7b to the upper part 7a is greatly stirred.

Provision of the throttle 7f at the upper end of the upper part 7a enhances the stirring at the exit end of the upper part. These functions contribute to the improvement of the calcination rate of the raw meal, and the perfect combustion of the unburnt carbon.

Figure 6:
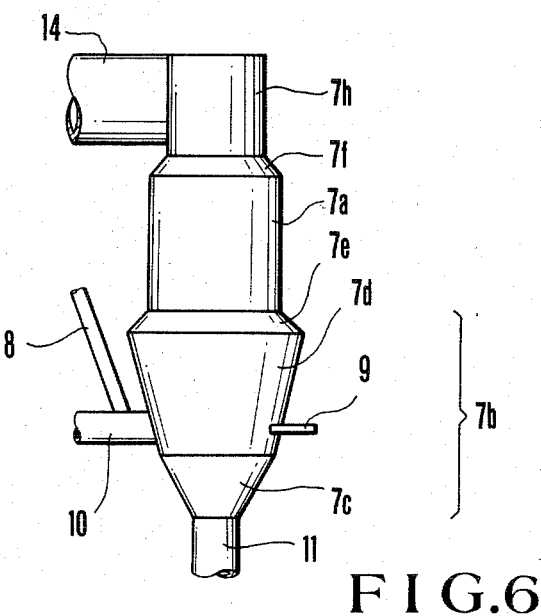
FIG. 6 shows a modification of FIG. 5 embodiment.
Figure 7:
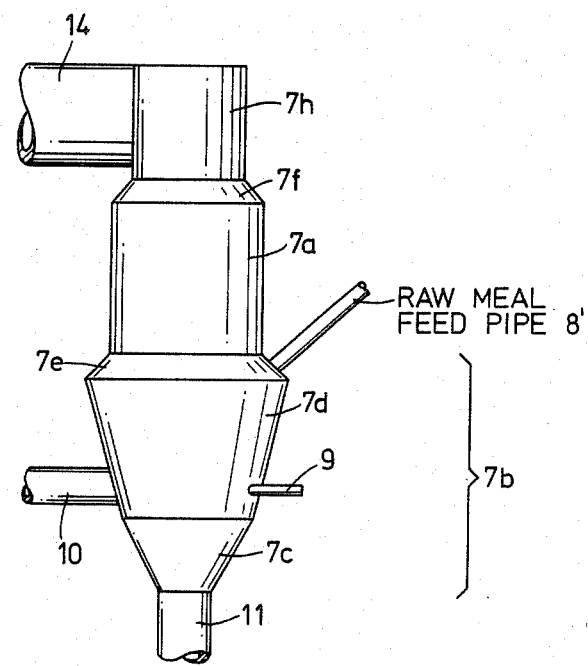
FIG. 7 shows a modification of FIG. 6 embodiment.

In a modification of the FIG. 5 embodiment, the throttle 7g is omitted as shown in FIG. 6, attaining the substantial effects of the present invention. In a modification of the FIG. 6 embodiment, raw meal feed pipe 8' is connected to throttle 7e so that raw meal can be admitted into the throttle 7e.

As has been described hereinabove, according to this invention, the precalciner is divided into upper and lower parts, the upper part is shaped into a cylinder (or with its upper end or upper and lower ends throttled) and the lower part is constituted by a lower inverted conical portion and an upper inverted conical portion which is connected to the lower end of the upper part through a narrowed opening or throttle. Accordingly, it is possible to increase the residence time of the raw meal, to maintain the raw meal at an optimum concentration, and to maintain uniform the concentration distribution while maintaining an adequate precalciner height, thereby efficiently calcining cement raw meal. Moreover, it is possbile to decrease the pressure loss, and to minimize the effect of the variations in the draft and the flow rate of the raw meal. As a consequence, the precalciner can operate very stably.

What is claimed is:

1. In a precalciner for cement raw meal of the type wherein the precalciner is connected between a rotary kiln and a suspension preheater for raw meal and provided with an independent heat source, the improvement wherein said precalciner is divided into an upper precalciner part and a lower precalciner part, the upper part is shaped into a cylinder having an upper end and a lower end and a diameter smaller than a maximum diameter of said lower part, the lower part is constituted by a lower inverted conical portion with its lower end connected to a kiln exhaust gas feed duct, and an upper inverted conical portion connected to an upper end of said lower inverted conical portion, said upper inverted conical portion having a cone angle smaller than that of said lower inverted conical portion, and wherein an upper end of said upper inverted conical portion is connected to said lower end of said upper part through throttle means and precalciner exhaust gas is discharged from said upper end of said upper part.

2. The precalciner according to claim 1 wherein opposite ends of said upper part are provided with throttle means.

3. The precalciner according to claim 1 wherein said throttle means comprises a constriction with a diameter gradually increasing from said upper part toward said upper inverted conical portion.

4. The precalciner according to claim 2 which further comprises a cylindrical member connected to said upper end of said upper part through said throttle member, said cylindrical member having a diameter smaller than that of said upper part and connected to a cyclone through a precalciner exhaust gas duct.

5. The precalciner according to claim 1 wherein the upper end of said upper part is provided with throttle means.

6. The precalciner according to claim 1 wherein the cone angle of said lower inverted conical portion is 45° to 90° and the cone angle of said upper inverted conical portion is 10° to 45°.

7. The precalciner according to claim 1 further comprising a tertiary air duct connected to said upper inverted conical portion and a raw meal feed pipe connected to the air duct.

8. The precalciner according to claim 1 further comprising a raw meal feed pipe connected to said throttle means.

* * * * *